(No Model.) 2 Sheets—Sheet 1.
H. L. HOPKINS.
PITMAN CONNECTION.
No. 421,715. Patented Feb. 18, 1890.
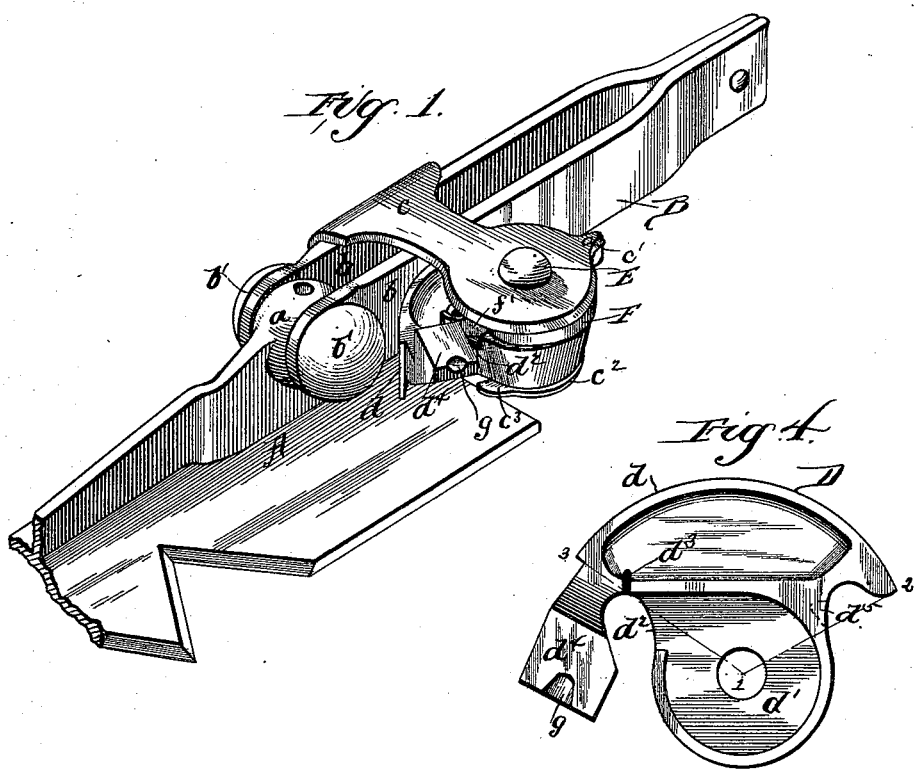
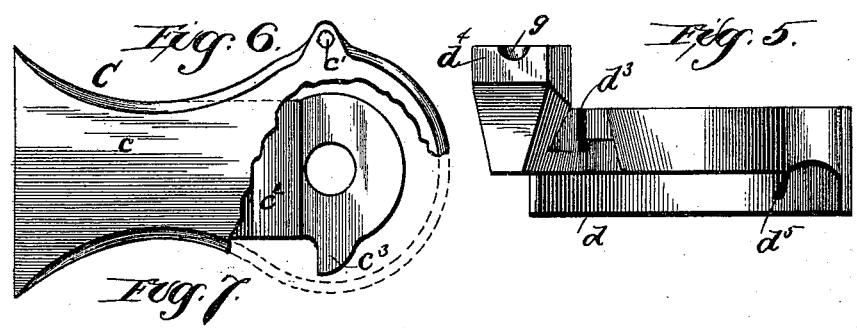
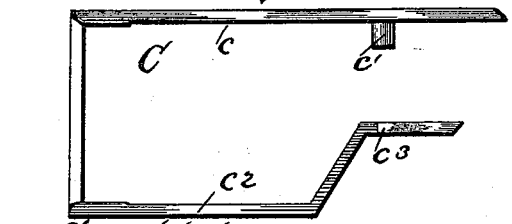
Inventor
Harvey L. Hopkins
Witnesses

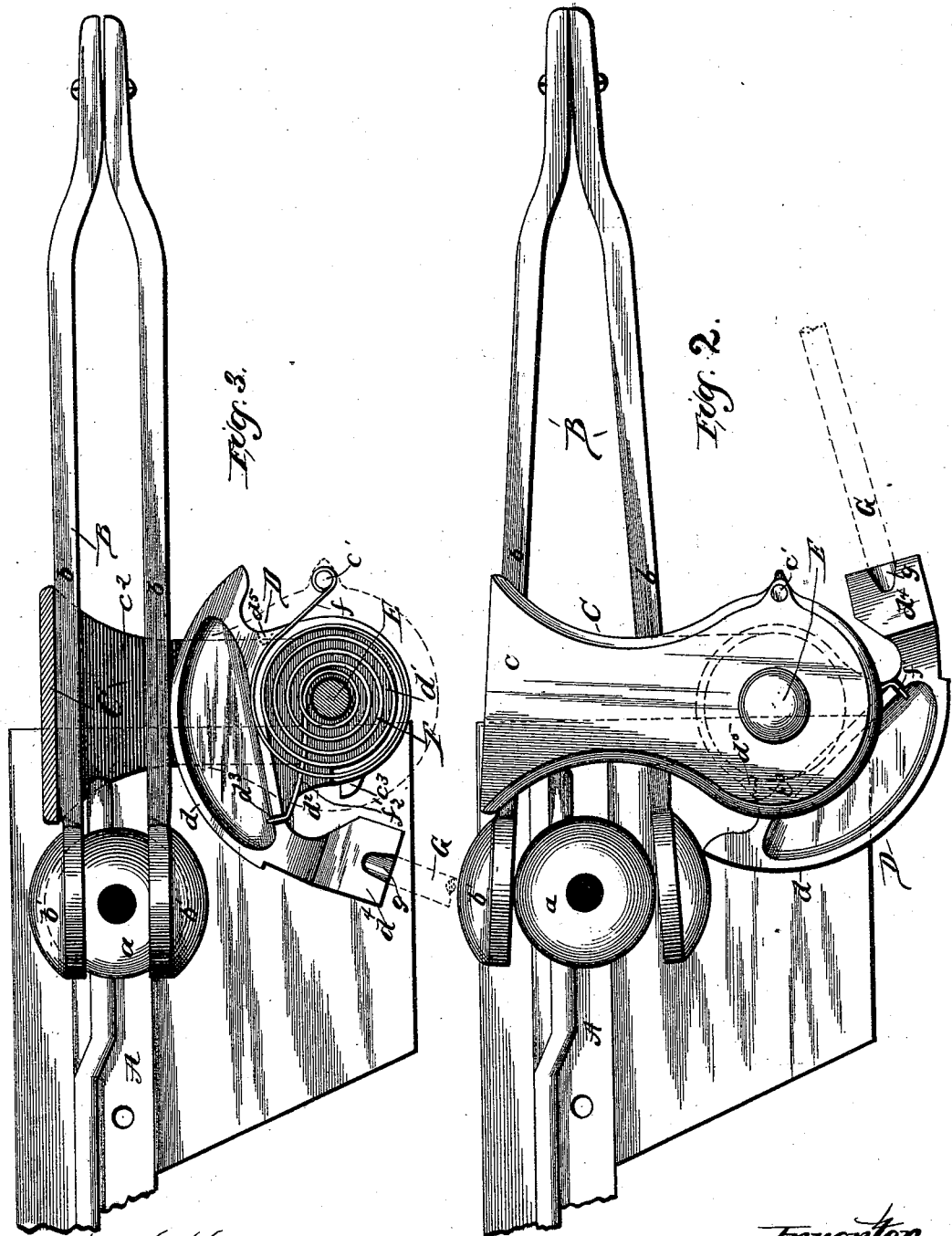

UNITED STATES PATENT OFFICE.

HARVEY L. HOPKINS, OF CHICAGO, ILLINOIS, ASSIGNOR TO EZRA McCORD, OF SAME PLACE.

PITMAN-CONNECTION.

SPECIFICATION forming part of Letters Patent No. 421,715, dated February 18, 1890.

Application filed December 13, 1889. Serial No. 333,583. (No model.)

*To all whom it may concern:*

Be it known that I, HARVEY L. HOPKINS, a citizen of the United States, residing at Chicago, in the county of Cook and State of Illinois, have invented certain new and useful Improvements in Pitman-Connections, which are fully set forth in the following specification, reference being had to the accompanying drawings, in which—

Figure 1 represents a perspective view of the lower end of a harvester-pitman and the inner end of a knife-bar with my invention applied; Fig. 2, a plan view of the same with the fastening device released; Fig. 3, a similar view with the fastening device in position and the top of the fastening-holder removed; Fig. 4, a detail plan of the fastening-cam detached; Fig. 5, a side elevation of the same; Fig. 6, a detail plan of the frame detached and a portion of the top broken away, and Fig. 7 a side elevation of the same. Fig. 1 of the drawings is on a scale by itself. All the other figures are upon the same scale, enlarged from the scale of Fig. 1.

My invention relates to the connection of pitmen with the parts which they are intended to drive, and more particularly to these devices where the connection is made by a ball-and-socket joint, though it is not limited to this particular kind of connection, but is applicable to any form of joint where there are parts to be clamped or held together.

The invention consists in a clamping device mounted in a separate frame or holder, which is applied to the branches of a pitman in such a way as to clamp them upon the ball or other member of the connecting-joint, this clamping device being in the shape of a cam actuated by a spring to hold it up to its work.

The invention is especially applicable to harvester-pitmen, where they are connected to the knife-head by a ball-and-socket joint, and I have in the drawings shown the invention applied to such a device, though I do not wish to be understood as limiting my improvement to this particular application of it as here shown.

The usual manner of making a ball-and-socket connection between the pitman and knife-head in harvesting-machines is to form the ball on the knife-head and fork the pitman at its lower end, providing a part of the socket on each fork, so as to embrace the ball between them. The ordinary manner of holding the sockets of the pitman up against the ball has been to pass an ordinary bolt through the two forks of the pitman near the knife-head and tighten the sockets upon the ball by a nut or some other like device on one end of the bolt. With such a device the proper adjustment of the sockets and ball depends upon the care and mechanical skill of those using the machine. If the nut on the bolt is set up too tightly, the overpressure of the sockets upon the ball will cause extra friction and a rapid wearing away of the parts, and will also increase the resistance to the driving-power occasioned by the required movement of the pitman and knife-bar, thereby increasing the power required in the machine and the general wear of the latter; but if the nut is not set up on the bolt sufficiently the sockets will be loose on the ball, thereby occasioning lost motion, which will soon produce lateral wear of both ball and sockets, thereby destroying the true circular joint, and after such wear the nicest adjustment of the parts by even a skilled mechanic will not produce a close joint and prevent lost motion. The injury thus effected is constantly increased and frequently results in breaking either the pitman or knife-head or both; or if there is no breakage the ball and sockets will wear so rapidly as to become perfectly useless before other parts of the machine show any perceptible wear.

In the application of my invention to harvesting-machines the object is to obviate all these difficulties and secure the clamping of the socketed arms upon the ball of the knife-head with a uniform pressure automatically applied, whereby a nicely-fitting joint is constantly obtained, but without any undue friction.

I will proceed to describe in detail a practical mode of applying my invention to harvester-pitmen, and will then point out more definitely in claims the special improvements which I believe to be new and wish to protect by Letters Patent.

In the drawings, A represents the knife-head of the knife-bar of a harvesting-machine, and it is provided with a ball $a$, for the purpose of making the connection with the pitman. Only a portion of the pitman B is shown, this being the lower portion, which is connected directly to the knife-head. This part of the pitman is forked—that is, it consists of two bars $b$, each of which terminates in a circular socket-piece $b'$, adapted to fit on each side of the ball and clasp the latter between them, as shown in Figs. 1 and 3 of the drawings. For the purpose of holding the arms of the pitman-fork together, so as to clamp the ball in the socket with a substantially uniform pressure, I provide a kind of clamping-frame C, which is substantially rectangular in shape, but is open at one end, as seen in Fig. 7 of the drawings. The upper bar $c$ of this frame is straight and has near the open end a short depending stud $c'$, arranged on one side of the bar. The lower bar $c^2$ is bent upward near the open end, so that the space between the two free ends of these bars is considerably less than in the body of the frame. This lower bar also has a short projection $c^3$, extending horizontally from one side of the arm near its free end, this side being opposite to that on which the stud before mentioned is located on the upper bar. Both of these bars are perforated at their free ends for the purpose of receiving a pivot-pin, as will presently be explained. The opening between the main portion of these bars is of a width corresponding to the width of the socket-bars on the pitman, so that the frame may be slipped over the latter and will then embrace the bars, as shown in Fig. 1 of the drawings.

A cam D is mounted on this frame, being arranged in the opening between the two free ends of the bars $c\ c^2$, to which it is pivoted by means of a pivot bolt or pin E, which passes through the apertures in the ends of these bars, and a corresponding aperture in the cam. The outer or cam edge $d$ of this piece is curved eccentrically to the pivot and is widened considerably, so as to make a broad bearing-surface, as seen in Fig. 5 of the drawings. In the upper surface of this cam is a depression $d'$, circular in form and extending around the pivot-opening and opening out at the edge of the cam on one side, as seen at $d^2$ in Fig. 4 of the drawings. The cam does not fill the entire open space at the end of the frame in which it is mounted, and a spiral spring F is arranged above the cam between it and the upper bar $c$, the coil of the spring being about the pivot-bolt E. The outer end $f$ of this spring is fastened to the stud $c'$ on the frame, and the inner end $f'$ lies in the depression in the upper side of the cam, being carried across the latter and out at the opening $d^2$, and is then fastened to the cam by insertion in a notch $d^3$, just outside of the said depression, as seen in Fig. 3 of the drawings. When the cam and spring are mounted in the frame, as described, the force of the spring will act to turn the cam inward into the main space of the frame, as seen in Fig. 3 of the drawings. Now, if the frame is slipped upon the socket-bars of the pitmen and the latter are arranged to embrace the ball, as shown in Figs. 1 and 3 of the drawings, and the cam is left to the action of the spring, it (the cam) will be turned inward by the force of the spring until it is brought in contact with the inside bar of the pitman, against which it will be held up firmly with a force depending upon the strength of the spring. The two socket-bars will therefore be clamped between this cam and the solid end of the frame, as seen in Figs. 1 and 3 of the drawings, and so the ball on the knife-head will be embraced firmly by the socket-pieces and will be held in this position by a practically-constant force, due to the strength of the spring.

In applying the frame to the pitman it will be convenient to turn the cam outward, so as to leave the entire open space of the frame unobstructed; and also, if it is desired to detach the pitman from the knife-head, it will be necessary to turn the cam outward, so that the fork-arms may be spread, as shown in Fig. 2 of the drawings, to permit them to be slipped off from the ball. To facilitate the turning of the cam against the action of the spring, it is provided with a short tail-piece $d^4$, by which a certain amount of leverage is obtained; and, furthermore, a short rod G may be provided, which is inserted in a socket $g$ in the tail of the cam when it is desired to turn the latter, this rod constituting a short lever, by which the cam may be turned easily. In order to prevent the cam from being turned too far, a short lug $d^5$ depends from its under side and on the side or edge of the cam opposite to the tail-piece. When the cam is turned outward, as seen in Fig. 2 of the drawings, this lug will finally come in contact with the projection $c^3$ on the frame, thereby stopping the further movement of the cam in this direction, as is also seen in Fig. 2 of the drawings, and the same lug $d^5$ will come in contact with the rising bend of the lower bar $c^2$ of the frame on the other side of the latter, so that it will stop the turning of the cam in an inward direction when the frame is detached from the pitman.

With this device a practically constant force is applied to the fork-arms of the pitman, so that the ball is clasped by the sockets with uniform pressure, and the force being automatically applied under the constant action of a spring all wear of the joint is taken up immediately, however slight it may be. The degree of force applied for the purpose of clamping the fork-arms upon the ball is easily regulated, so that the pressure of the cam will only be sufficient to hold the parts in proper working position, and as the application of this pressure is not determined by any adjustment effected by the attendant it can never be increased so as to produce undue friction, or decreased so as to produce lost motion. At the same time the ball and the socket-pieces are readily movable upon each other, so that the joint is free working. The wear also of the joint will be uniform, as the pressure is uniform, whatever may be the relative position of the parts. It will also be seen that this device provides for the ready and convenient attachment of the pitman to the knife-head, and also for its detachment therefrom, and as the connection and disconnection of these parts are matters of quite frequent necessity in harvesting-machines this result is quite an important one. There are no nuts or screw-bolts to remove or to apply in connecting or disconnecting the parts. The connection has already been described, and in Fig. 2 of the drawings the disconnection is fully illustrated. It is only necessary to turn the cam back in the position shown in Fig. 2, when the fork-arms of the pitman may be spread sufficiently to be disengaged from the ball on the knife-head, and then, if desired, the clamping-frame may be slipped off over the socketed ends of these arms. In order to obtain these desirable results, it is obvious that the relation of the parts should be determined with some care, especially as to the pitch of the cam and the strength of the spring. I will therefore give an illustration which will serve somewhat as a guide for this purpose, though no arbitrary rule can be specified. The length of the frame which is placed upon the pitman should be such as to permit the cam to be turned inward, so that its point of contact with the fork-arm of the pitman when in position, as seen in Fig. 3 of the drawings, is about the center of the cam-face lengthwise. This of course will depend upon the shape and size of the pitman and also the shape and size of the cam, which are not arbitrary. The following dimensions, however, I have found will provide devices which operate satisfactorily: Suppose the diameter of the ball on the knife-head to be one and one-fourth inches and the fork-arms of the pitman running about parallel when closed on the ball. The distance from the pivot of the cam to the point of contact with the pitman should then be about one and seventeen thirty-seconds inch. The length of the cam-face is about three inches, and with this length of face I give about five-sixteenths of an inch take-up or pitch to the cam—that is, the distance on the line 1 2 from the center of motion to the head or initial point of the cam is about five-sixteenths of an inch less than the distance on the line 1 3 from the said center to the tail end of the cam-face. With these dimensions the strength of the spring should be such as to give a resistance of about five pounds, placed eight inches from the center of the spring, when the latter is coiled to the extent produced by the complete opening of the cam—that is, when the latter is brought into the position shown in Fig. 2 of the drawings. These relative dimensions of the parts specified, I find, give entirely satisfactory results, but I give them simply for illustration, and am not to be understood as restricting my invention to these limitations in construction. The dimensions may be changed in different locations, and the pitch or take-up of the cam may be increased or diminished. If increased without other changes, the strength of the spring should be increased, and if diminished the spring should be weakened to correspond. Furthermore, as already stated, I do not wish to be understood as limiting my invention to its application herein shown and described to harvester-pitmen, or to pitmen generally; but I claim the invention wherever it may be applied for the purpose of clamping two movable pieces together without radical change in construction. It may be applied to the two parts of journal-boxes and any other like position with satisfactory results; hence I do not wish to be understood either as limiting my invention to a special application to harvester or other pitmen, or to the special construction and arrangement of the parts herein shown and described, when applied to pitmen or elsewhere. Springs of different construction may be applied and a different piece substituted for the cam, provided this piece always has an inclined or wedging face to provide for take-up, and the holder for the devices and the mounting of them therein may be varied from that here shown.

Having thus described my invention, what I claim as new, and desire to secure by Letters Patent, is—

1. Two bearing-surfaces adapted to receive and clasp between them a ball or other like journal, in combination with a holding-frame applied to and surrounding supports carrying the said bearing-surfaces, a cam mounted in said frame and arranged to clamp the said bearings together, and a spring arranged to actuate the said cam automatically, substantially as and for the purposes specified.

2. The knife-head A, provided with a ball a, in combination with the forked arms b of the pitman provided with sockets adapted to receive the said ball, the clamping-frame C, adapted to receive the arms of the pitman, the cam D, pivoted on said frame, and the actuating-spring F, arranged to turn the cam inward against one arm of the pitman, substantially as and for the purposes specified.

3. The fork-arms b of the pitman, adapted to receive and clamp a ball between them, in combination with the clamping-frame C, adapted to be slipped upon said arms, the cam D, pivoted between the open ends of the frame, and the actuating-spring F, coiled around the pivot-pin of the cam and connected at one end to the latter and at the other to the frame, substantially as and for the purposes specified.

4. The fork-arms $b$ of the pitman, in combination with the clamping-frame C, provided with the lug or projection $c^3$, the cam D, pivoted on said frame and provided with the lug $d^5$, and the actuating-spring F, substantially as and for the purposes specified.

5. The fork-arms $b$ of the pitman, in combination with the clamping-frame C, the cam D, pivoted in said frame and provided with socket $g$, the actuating-spring F, and the detachable lever or handle G, substantially as and for the purposes specified.

HARVEY L. HOPKINS.

Witnesses:
CARRIE FEIGEL,
A. M. BEST.